United States Patent [19]

Umenoto et al.

[11] Patent Number: 4,670,797
[45] Date of Patent: Jun. 2, 1987

[54] METHOD OF MAGNETICALLY RECORDING CODED DIGITAL VIDEO SIGNALS AND AN APPARATUS THEREFOR

[75] Inventors: Masuo Umenoto, Nishitama; Seiichi Mita, Tsukui; Morishi Izumita, Inagi; Yuuichi Michikawa, Katsuta; Morito Rokuda, Kokubunji; Hitoshi Katayama, Nerima; Hidehiro Kanada, Kodaira, all of Japan

[73] Assignees: Hitachi, Ltd.; Hitachi Denshi Kabushiki Kaisha, both of Tokyo, Japan

[21] Appl. No.: 702,600

[22] Filed: Feb. 19, 1985

[30] Foreign Application Priority Data

Feb. 24, 1984 [JP] Japan .................................. 59-33543

[51] Int. Cl.⁴ .......................... G11B 5/09; G11B 20/16
[52] U.S. Cl. ...................................... 358/310; 360/39; 360/40; 360/32; 369/59
[58] Field of Search ................... 358/310, 334,-339; 360/32, 39, 40, 41, 48; 340/347 DD, 347 R, 347 M; 369/59

[56] References Cited

U.S. PATENT DOCUMENTS

| | | | |
|---|---|---|---|
| 4,343,023 | 8/1982 | Nishimura et al. | 360/40 |
| 4,387,364 | 6/1983 | Shirota | 369/59 |
| 4,484,176 | 11/1984 | Fitzpatrick | 360/40 |
| 4,499,454 | 2/1985 | Shimada | 369/59 |
| 4,520,401 | 5/1985 | Takahashi et al. | 358/310 |
| 4,547,890 | 10/1985 | Gindi | 369/59 |

*Primary Examiner*—Raymond F. Cardillo
*Assistant Examiner*—Robert A. Weinhardt
*Attorney, Agent, or Firm*—Antonelli, Terry & Wands

[57] ABSTRACT

An improved 8-8 mpping table system in digitally and magnetically recording video signals. Video signals coded into natural binary codes consisting of 8 bits are converted into different binary codes consisting of 8 bits constituted by patterns in which a continuous number of the 1's or the 0's does not exceed a predetermined number. In these codes, the continuous number of the 1's or the 0's is so limited that a maximum magnetization interval is reduced in magnetically recording the signals. Therefore, erroneous code is prevented from occurring in reproducing the signals.

34 Claims, 6 Drawing Figures

METHOD OF MAGNETICALLY RECORDING CODED DIGITAL VIDEO SIGNALS AND AN APPARATUS THEREFOR

The present invention relates to a digital magnetic video recording method and an apparatus therefor, and particularly to a method and an apparatus for converting video signals such as television signals into codes of a structure adapted to digital recording.

To digitally record video signals of a television system onto a VTR (video tape recorder), analog video signals are first converted into digital signals of N bits through an A/D converter (analog-to-digital converter) and are then recorded onto a magnetic recording medium. With an ordinary magnetic recording, however, it is not allowed to reproduce very low frequencies or d-c components. In the digital magnetic video recording apparatus, therefore, a variety of channel coding methods have been proposed to superpose a-c components on the digital signals obtained through the A/D conversion so that d-c components will not generate.

Among these channel coding methods, attention has been given to a so-called N-N mapping table system which utilizes a correlation of television signals that are to be recorded.

Figure 1:
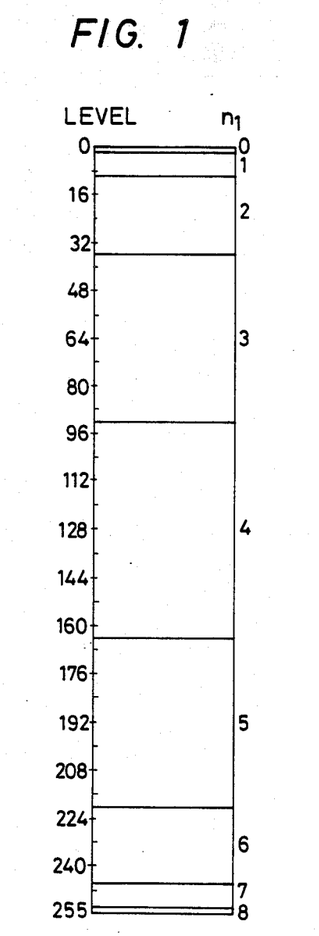
FIG. 1 is a diagram showing a conventional 8—8 mapping table.

FIG. 1 is a diagram showing a conventional 8—8 mapping table.

Digital television signals should desirably be capable of expressing sufficient tones that do not appear unnatural to human eyes. Usually, therefore, signals consisting of eight bits are used. When binary codes of eight bits are used, 256 levels (tones) can be expressed maintaining a signal-to-noise ratio of 59 dB.

A table for conventing a binary code consisting of eight bits into another binary code consisting of eight bits containing d-c components in small amounts, is an 8—8 mapping table. The 8—8 mapping table of FIG. 1 converts natural binary codes produced by the A/D converter into codes which are rearranged in ascending order of the numbers ($n_1$) of the 1's contained in eight bits. For instance, a natural binary code corresponding to a level 16 is "00010000". This code is converted into a code "01000010" which contains two 1's. Natural binary codes that represent 256 levels are expressed by the combinations of the 1's and the 0's of from "00000000" to "11111111". The code in which the number $n_1$ of the 1's is 0 in the eight bits, is "00000000" only. There are eight codes in which the number $n_1$ of the 1's is 1 in the eight bits, i.e., from "00000001" to "10000000". There are 28 codes in which $n_1=2$, i.e., from "00000011" to "11000000". There are a total of 256 codes up to the one in which $n_1=8$ as shown in FIG. 1. These codes are rearranged in ascending order of their respective numbers $n_1$ to obtain new codes corresponding to each of the levels. In this code system, the code corresponding to the level 16 is "01000010".

The television signals have a strong correlation, and values of neighboring two samples do not much differ from each other. Therefore, a sample value next of a sample value of, for example, a level 16, does not much change and becomes, for instance, a level 32. As will be obvious from FIG. 1, the number $n_1$ of the 1's in the code consisting of eight bits corresponding to the level 32 after converted is 2 like that of the level 16. When the sample values are arranged continuously, the number of the 0's continues so that d-c components are formed. If the code corresponding to the sample value 32 is inverted after the code conversion, the number $n_1$ of the 1's becomes 6. Hence, the codes which are corresponding to two sample values (16,32) and latter one of which has been inverted have the 1's and the 0's in an equal number, without containing d-c components.

Thus, the 8—8 mapping table system is capable of converting the binary codes into those binary codes that generate d-c components little by utilizing the correlation of television signals.

Another important problem in considering the channel coding is how to minimize a maximum magnetization interval. In the case of NRZ (non-return to zero)-type recording, there develops a pattern peak shift in the patterns in which the 0's or the 1's are continuing. For instance, when three sample values are continuing like in the cases of codes "00001111", "11101000", and "00001111" that have been converted by the 8—8 mapping table, the 1's and the 0's are maintained in equilibrium in every eight bits relying upon the 8—8 mapping table system. Partially, however, the 1's may continue. The magnetic recording is a non-linear recording. In the above-mentioned example, therefore, a peak where "1" is formed may undergo the shift in "1" of the second sample, making it difficult to correctly reproduce the signals.

It is therefore desired to so correct the 8—8 mapping table that the 1's or the 0's will not continue as far as possible.

The object of the present invention is to provide a digital video recording method with high reliability, which is free from the aforementioned problems inherent in the conventional art, and which converts the codes into those of patterns in which the 1's or the 0's are not continuing, in order to reduce the occurrence of error signals.

The above object is accomplished by the present invention which provides a method of magnetically recording video signals, comprising:

a step for coding an analog video signal using a first binary code;

a step for converting the signal coded by said first binary code into a second binary code having a pattern which satisfies $$n_m \leq 2k, \ n_s \leq k, \ n_r \leq k$$

when $n_{max}=2k$, or which satisfies $$n_m \leq 2k+1, \ n_s \leq k+1, \ N_R \leq k, \text{ or } n_s \leq k, \ n_r \leq k+1$$

when $n_{max}=2k+1$, where, $n_{max}$ denotes a maximum continuous number of the same digits that develop when code patterns of two given samples are continuing, $n_s$ denotes a number of digits as counted from the first digit until a digit different from the first digit of the code pattern appears, $n_r$ denotes a number of digits as counted from the last digit until a digit different from the last digit of the code pattern appears, $n_m$ denotes a continuous number of the same digits that exist in a portion between the first digit and the last digit of the code pattern, and k denotes a positive integer; and a step for recording the signal that has been converted into the second binary code onto a magnetic recording medium after having inverted the code of every other sample.

In the accompanying drawings.

The principle of the present invention will be described below.

In continuously producing two data each consisting of eight bits, if it is attempted to limit the continuous number of the 0's or the 1's, the number of patterns allowed in the 8-bit patterns decreases. That is, if the continuous number of the 0's or the 1's is reduced, increased number of patterns must be cut off, enabling the reliability to be enhanced but resulting in the lack of number of levels that serve as sample values. If the continuous number of the 0's or the 1's is allowed to increase to some extent, on the other hand, the number of levels does not decrease so much, but the reliability is not so high, thus presenting a conflicting relationship.

The continuous number of the 1's or the 0's for a given eight-bit pattern can be evaluated in terms of a number $n_s$ of digits as counted from a first digit until there appears a digit having a code polarity different from the code polarity (1 or 0) of the first digit of the pattern, in terms of a number $n_r$ of digits as counted from the last digit until there appears a digit of a code polarity different from that of the last digit in the same pattern, and in terms of a number $n_m$ of the same digits (1's or 0's) that are present continuously in a middle portion of the pattern between the first digit and the last digit. In other words, $n_s$ represents a continuous number of the same digits in the first portion of the code pattern, and $n_r$ represents a continuous number of the same digits in the last portion of the code pattern.

Here, between the two continuous data each consisting of eight bits, the former one is denoted by A, and the latter one is denoted by B. Then, A="00100010" is represented by $(n_s)_A=2$, $(n_r)_A=1$, $(n_m)_A=3$, and B="01001000" is represented by $(n_s)_B=1$, $(n_r)_B=3$, $(n_m)_B=2$. In continuously producing the above two 8-bit data A and B, if the code polarity of the last digit of the data A is the same as the code polarity of the first digit of the data B, the continuous number of the 1's or the 0's increases. Further, if attention is given to the case where the data B exists in front of the data A, a problem arises in regard to a continuous number when the code polarity of the last digit of the data B is the same as the code polarity of the first digit of the data A.

That is, when the two 8-bit data A, B are continuously produced in irregular order, a maximum value 5 among $(n_r)_A=(n_s)_B=2$, $(n_r)_B=(n_s)_A=5$, $(n_m)_A=3$, and $(n_m)_B=2$, serves as a maximum magnetization interval. Namely, when two given data a and b each consisting of n bits are produced continuously, a maximum continuous number of the same digits, i.e., a maximum magnetization interval $n_{max}$, is given by the following equation, $$n_{max} = \max \begin{bmatrix} (n_r)_a + (n_s)_b \\ (n_r)_b + (n_s)_a \\ (n_m)_a \\ (n_m)_b \end{bmatrix} \quad (1)$$

Here, max [ ] means that a maximum value is employed among them.

Table 1 shows how to select 8-bit patterns in which the 1's or the 0's do not appear continuously in a number of greater than 6, when a maximum magnetization interval $n_{max}$ is 6, and shows the total number of the patterns under the condition of $n_m \leq 6$.

TABLE 1

| $n_{max} = 6$ | |
|---|---|
| How to select | Number of patterns that can be employed ($n_m \leq 6$) |
| $n_s \leq 4$, $n_r \leq 2$ | 180 |
| $n_s \leq 3$, $n_r \leq 3$ | 196 |
| $n_s \leq 2$, $n_r \leq 4$ | 180 |
| $n_s = 1$, $n_r \leq 5$ | 124 |

According to the recommendation by the CCIR (Comité0 Consultatif International des Radiocommunications), 200 levels are allotted to the luminance signals and 224 levels are allotted to the chrominance signals when the componet coding method ls employed (when luminance signals and chrominance signals are to be individually sampled and quantized). Therefore, all of 256 levels need not be utilized in effecting the 8-bit quantization.

In table 1, the number of patterns that satisfy $n_s \leq 4$ and $n_r \leq 2$, that satisfy $n_s \leq 3$ and $n_r \leq 3$, that satisfy $n_s \leq 2$ and $n_r \leq 4$, and that satisfy $n_s \leq 1$ and $n_r \leq 5$, under the condition of $n_m \leq 6$ when $n_{max}=6$, are as shown in the right column of Table 1. There are the greatest number of patterns that satisfy $n_s \leq 3$ and $n_r \leq 3$. That is, when the 8-bit patterns are to be used with $n_{max}=6$, the patterns that satisfy $n_s \leq 3$, $n_r \leq 3$ should be selected most advantageously, since up to 196 levels can be used in this case.

After having studied the number of patterns by variously changing the value $n_{max}$, the inventors have reached the conclusion that it is most desirable to use the code patterns that satisfy $n_m \leq 2k$, $n_r \leq k$, $n_s \leq k$, when $n_{max}$ is an even number ($=2k$, where k is a positive integer). When the value $n_{max}$ is an odd number ($=2k+1$), it is most desirable to select the code patterns that satisfy $n_m \leq 2k+1$, $n_r \leq k$, $n_s \leq k+1$, or that satisfy $n_m \leq 2k+1$, $n_s \leq k$, $n_r \leq k+1$.

Figure 2:
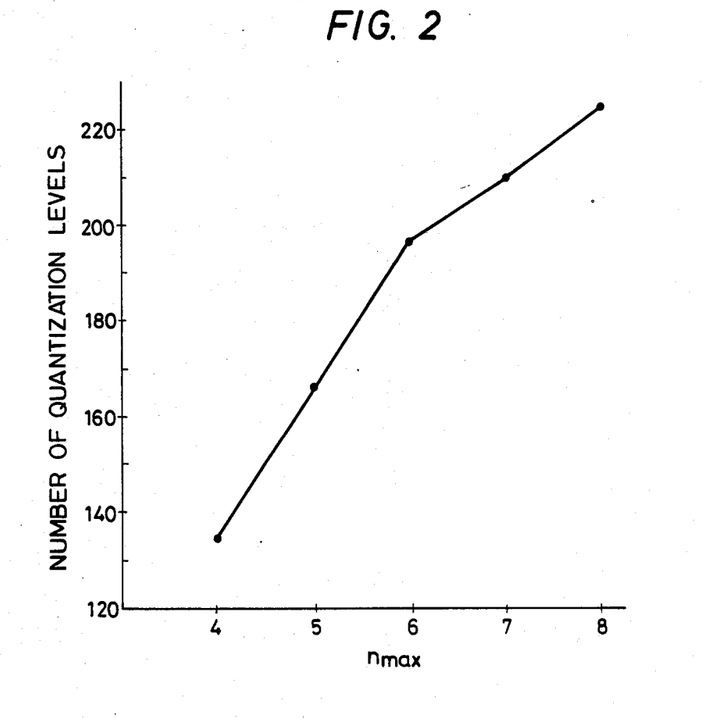
FIG. 2 is a diagram showing maximum numbers of eight-bit patterns with $n_{max}=4$ to 8.

FIG. 2 is a diagram showing a maximum number of 8-bit patterns that can be utilized, i.e., showing a number of quantization levels when the 1's or the 0's are not continuing in a number of more than n ($n_{max}=4$ to 8).

As will be obvious from FIG. 2, the number of quantization levels is 134 when $n_{max}=4$, 166 when $n_{max}=5$, 196 when $n_{max}=6$, 210 when $n_{max}=7$, and 226 when $n_{max}=8$. Though the number of quantization levels is better large, it is recommended to select a value near $n_{max}=6$ from the standpoint of reliability.

Figure 3:
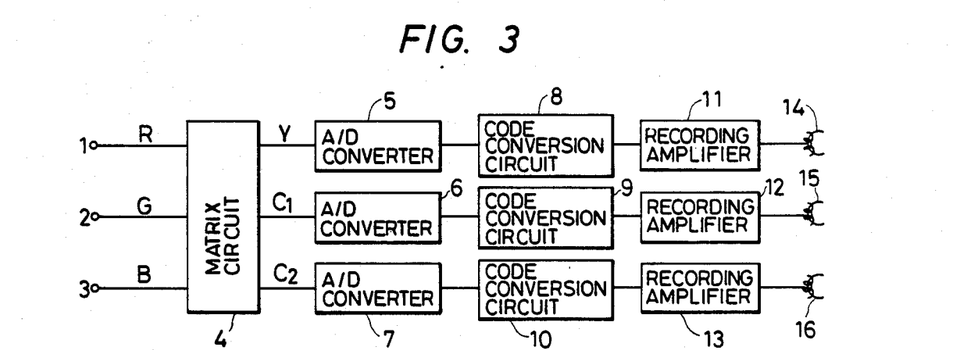
FIG. 3 is a diagram of signal systems of a digital video recorder according to an embodiment of the present invention.

FIG. 3 is a diagram of signal systems in a digital video recorder according to an embodiment of the present invention.

Red, green and blue signals R, G, B produced by a color camera (not shown) are input to red, green and blue signal input terminals 1, 2, 3 of a matrix circuit 4 which produces a luminance signal Y and chrominance signals $C_1$, $C_2$. These signals Y, $C_1$ and $C_2$ are converted into digital signals of natural binary codes each consisting of eight bits through A/D converters 5, 6 and 7.

Figure 4:
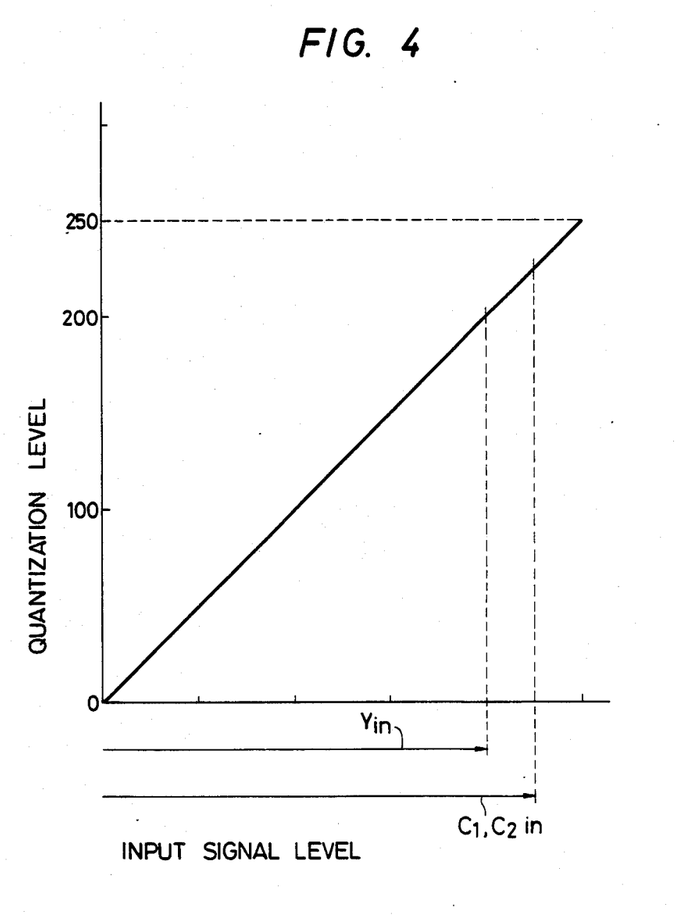
FIG. 4 is a diagram showing a relation between the input signal level and the quantization level in the A/D conversi,on of FIG. 3.
Figure 5A:
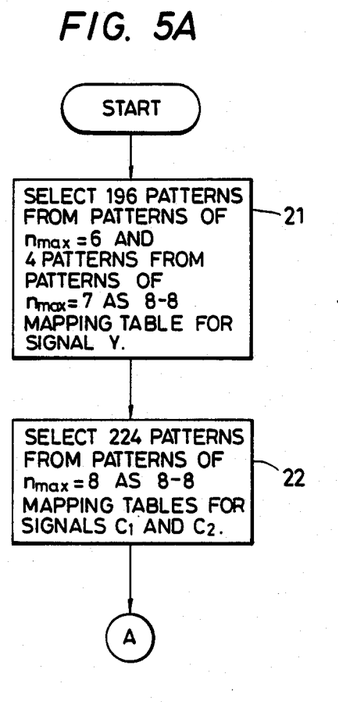
FIGS. 5A and 5B are processing flow charts by a digital video recording method according to the embodiment of the present invention.
Figure 5B:
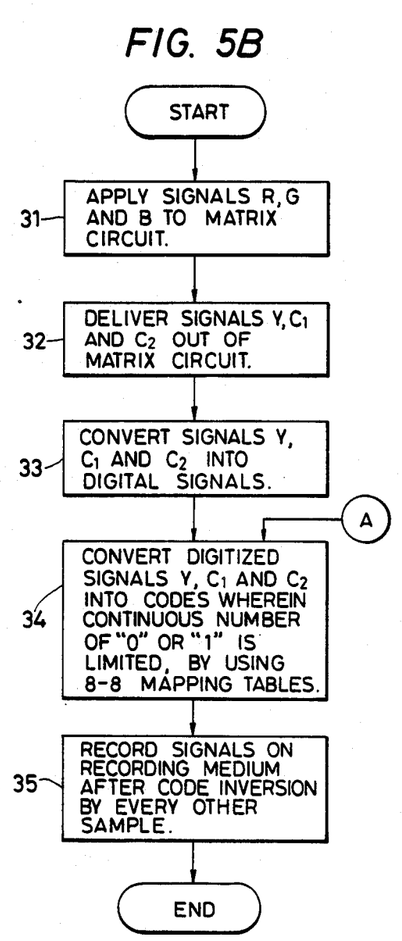

FIG. 4 is a diagram showing a relation between the input signal level and the quantization level in the A/D converters of FIG. 3, and FIGS. 5A and 5B are processing flow charts by the video recording method according to the embodiment of the present invention.

As shown in FIG. 4, there exists a linear relation between the input level and the quantization level in the A/D converters 5, 6, 7 of FIG. 3. Among the input levels, a maximum input level (Yin) of luminance signal Y is so controlled that the quantization level after the A/D conversion will not become greater than 200 (to obtain a level allotted by the CCIR recommendation). Similarly, maximum input levels ($C_1$ in, $C_2$in) of chrominance signals $C_1$, $C_2$ are so controlled that the quantization level will become 224.

According to the embodiment of the present invention as shown in FIG. 5A, the patterns of $n_{max}=6$ ($n_m \leq 6$, $n_r \leq 3$, $n_s \leq 3$) are first used preferentially as an 8—8 mapping table for the luminance signal Y to assure 196 quantization levels. As for the patterns for remaining four levels, there are selected three patterns in which there are six 1's in eight bits, as well as a pattern in which there are seven or five 1's, out of those of $n_{max}=7$ ($n_m \leq 6$, $n_r \leq 3$, $n_s \leq 4$ or $n_r \leq 4$, $n_s \leq 3$). This table is stored in a ROM (read-only memory) in the code conversion circuit 8 of FIG. 3 (block 21 of FIG. 5A). Mapping tables for the chrominance signals $C_1$ and $C_2$ require 224 quantization levels. Therefore, the patterns of $n_{max}=8$ ($n_m \leq 6$, $n_r \leq 4$, $n_s \leq 4$) are employed and are stored in the ROM's of code conversion circuits 9, 10 of FIG. 3, respectively (block 22 of FIG. 5A).

By so doing, the table for luminance signals satisfies $n_{max}=6$ at most of the quantization levels. Although $n_{max}=7$ is set in the proximity of the maximum input level, such maximum input levels develop scarecely in the practical television signals. Virtually, therefore, patterns of $n_{max}=6$ can be assured.

The picture is practically taken using a color television camera. Video signals R, G, B which represent red, green and blue colors of the subject are then produced by the camera and are input to the matrix circuit 4 (block 31 of FIG. 5B) which produces luminance signal Y and chrominance signals $C_1$, $C_2$ (block 32 of FIG. 5B). These signals Y, $C_1$ and $C_2$ are converted through the A/D converters into digital signals of natural binary codes each consisting of eight bits (block 33 of FIG. 5B). These digital signals are converted into digital signals of codes in which continuous numbers of the 0's and the 1's have been limited (block 34 of FIG. 5B) by the 8—8 mapping tables that have been prepared in advance. Codes of the thus converted digital signals are inverted on every other sample, and are recorded by recording amplifiers 11, 12, 13 onto a recording medium such as a magnetic tape in the NRZ form via heads 14, 15 and 16 (block 35 of FIG. 5B). Each of the code conversion circuits 8, 9 and 10 has an inverter circuit in which the codes of the signals that have obtained through the code conversion are inverted on every other sample. Each of the code conversion circuits 8, 9 and 10 produces the signals of which the codes have been converted and of which the codes have been inverted on every other sample.

Tables 2 and 3 partly illustrate 8—8 mapping tables for the luminance signal Y and chrominance signals $C_1$, $C_2$, according to an embodiment of the present invention.

In Table 2, patterns with $n_{max}=6$ ($n_m \leq 6$, $n_r \leq 3$, $n_s \leq 3$) are used for the quantization levels 0 to 195. For the quantization levels 196 to 199, use is made of three patterns in which the number of the 1's is 6, and a pattern in which the number of the 1's is 7, among the patterns of $n_{max}=7$ $n_m \leq 6$, $n_r \leq 4$, $n_s \leq 3$ or $n_r \leq 3$, $n_s \leq 4$).

Among the patterns of $n_{max}=7$, there are particularly used patterns in which the number of the 1's is 6 or 7, because of the reasons described below. The patterns of $n_{max}=6$ alloted to the level 195 and to the neighboring levels (lower than 195) have six 1's. Therefore, if such patterns are alloted to the levels 196 to 199 that have the number of the 1's the same (six) as, or very close (seven or five) to, the number of the 1's alloted to the level 195 and neighboring levels, d-c components can be prevented from generating by inverting the codes of every other sample in reliance on the correlation of television signals.

In Table 3, patterns of $n_{max}=8$ ($n_m \leq 6$, $n_r \leq 4$, $n_s \leq 4$) are used for all of the quantization levels 0 to 225.

In Tables 2 and 3, $n_m$ denotes a continuous number of the same digits that exist in a portion between the first digit and the last digit of the output code pattern, $n_s$ denotes a number of digits as counted from the first digit until a digit different from the first digit of the output code pattern appears, $n_r$ denotes a number of digits as counted from the last digit until a digit different from the last digit of the output code pattern appears, and $n_1$ denotes the number of the 1's that exist in the output code pattern.

In the case that 224 levels are allotted to the chrominance signals in accordance with the CCIR recommendation, the level 224 and the level 225 in the Table 3 need not be utilized.

TABLE 2

| Quantization levels | Input codes | Output codes | $n_m$ | $n_s$ | $n_r$ | $n_1$ |
|---|---|---|---|---|---|---|
| 0 | 00000000 | 00010001 | 3 | 3 | 1 | 2 |
| 1 | 00000001 | 00010010 | 2 | 3 | 1 | 2 |
| 2 | 00000010 | 00010100 | 1 | 3 | 2 | 2 |
| 3 | 00000011 | 00011000 | 2 | 3 | 3 | 2 |
| 4 | 00000100 | 00100001 | 4 | 2 | 1 | 2 |
| 5 | 00000101 | 00100010 | 3 | 2 | 1 | 2 |
| 6 | 00000110 | 00100100 | 2 | 2 | 2 | 2 |
| 7 | 00000111 | 00101000 | 1 | 2 | 3 | 2 |
| 8 | 00001000 | 01000001 | 5 | 1 | 1 | 2 |
| 9 | 00001001 | 01000010 | 4 | 1 | 1 | 2 |
| 10 | 00001010 | 01000100 | 3 | 1 | 2 | 2 |
| ↓ | | | | | | ↓ |
| 186 | 10111010 | 10111101 | 4 | 1 | 1 | 6 |
| 187 | 10111011 | 10111110 | 5 | 1 | 1 | 6 |
| 188 | 10111100 | 11010111 | 1 | 2 | 3 | 6 |
| 189 | 10111101 | 11011011 | 2 | 2 | 2 | 6 |
| 190 | 10111110 | 11011101 | 3 | 2 | 1 | 6 |
| 191 | 10111111 | 11011110 | 4 | 2 | 1 | 6 |
| 192 | 11000000 | 11100111 | 2 | 3 | 3 | 6 |
| 193 | 11000001 | 11101011 | 1 | 3 | 2 | 6 |
| 194 | 11000010 | 11101101 | 2 | 3 | 1 | 6 |
| 195 | 11000011 | 11101110 | 3 | 3 | 1 | 6 |
| 196 | 11000100 | 01101111 | 2 | 1 | 4 | 6 |
| 197 | 11000101 | 10101111 | 1 | 1 | 4 | 6 |
| 198 | 11000110 | 11001111 | 2 | 2 | 4 | 6 |
| 199 | 11000111 | 11101111 | 1 | 3 | 4 | 7 |

TABLE 3

| Quantization levels | Input codes | Output codes | $n_m$ | $n_s$ | $n_r$ | $n_1$ |
|---|---|---|---|---|---|---|
| 0 | 00000000 | 00001000 | 1 | 4 | 3 | 1 |
| 1 | 00000001 | 00010000 | 1 | 3 | 4 | 1 |
| 2 | 00000010 | 00001001 | 2 | 4 | 1 | 2 |
| 3 | 00000011 | 00001010 | 1 | 4 | 1 | 2 |
| 4 | 00000100 | 00001100 | 2 | 4 | 2 | 2 |
| 5 | 00000101 | 00010001 | 3 | 3 | 1 | 2 |
| 6 | 00000110 | 00010010 | 3 | 3 | 1 | 2 |
| 7 | 00000111 | 00010100 | 1 | 3 | 2 | 2 |
| 8 | 00001000 | 00011000 | 2 | 3 | 3 | 2 |
| 9 | 00001001 | 00100001 | 4 | 2 | 1 | 2 |
| 10 | 00001010 | 00100010 | 3 | 2 | 1 | 2 |
| ↓ | | | | | | ↑ |
| 212 | 11010100 | 11001111 | 2 | 2 | 4 | 6 |
| 213 | 11010101 | 11010111 | 1 | 2 | 3 | 6 |
| 214 | 11010110 | 11011011 | 2 | 2 | 2 | 6 |
| 215 | 11010111 | 11011101 | 3 | 2 | 1 | 6 |
| 216 | 11011000 | 11011110 | 4 | 2 | 1 | 6 |
| 217 | 11011001 | 11100111 | 2 | 3 | 3 | 6 |
| 218 | 11011010 | 11101011 | 1 | 3 | 2 | 6 |
| 219 | 11011011 | 11101101 | 2 | 3 | 1 | 6 |
| 220 | 11011100 | 11101110 | 3 | 3 | 1 | 6 |
| 221 | 11011101 | 11110011 | 2 | 4 | 2 | 6 |
| 222 | 11011110 | 11110101 | 1 | 4 | 1 | 6 |
| 223 | 11011111 | 11110110 | 2 | 4 | 1 | 6 |
| 224 | 11100000 | 11101111 | 1 | 3 | 4 | 7 |
| 225 | 11100001 | 11110111 | 1 | 4 | 3 | 7 |

Although 8—8 mapping tables were used in this embodiment, it is also possible to convert the codes into codes in which the continuous number of the 1's or the 0's is smaller than that of the cases of 8—8 mapping tables, by converting digital data consisting of eight bits into a code consisting of nine bits using an 8–9 mapping table. That is, if code patterns consisting of nine bits are considered by adapting the present invention to the 8–9 conversion, a conversion table can be prepared by preferentially using 9-bit patterns that satisfy $n_s \leq 2$, $n_r \leq 2$ and $n_m \leq 5$ for 256 quantization levels of input signals using 8–9 mapping tables. That is, it is possible to reduce the continuous number of the 1's or the 0's to five or to smaller than five.

When video signals are to be treated, furthermore, an optimum number N of bits for quantization is 6 to 8. Even in the present invention, it is advantageous to use this value from the standpoint of constituting the conversion mapping.

According to the present invention as described in the foregoing, the signals to be recorded are converted into patterns in which the 1's or the 0's do not continue by more than a predetermined number before they are recorded, relying upon the 8—8 mapping tables in order to reduce d-c components that generate in carrying out the magnetic recording. Therefore, occurrence of erroneous signals caused by pattern peak shift can be reduced, and the digital magnetic recording can be performed maintaining increased reliability.

What is claimed is:

1. A method of magnetically recording video signals, comprising:
    a step for coding an analog video signal using a first binary code;
    a step for converting the signal coded by said first binary code into a second binary code having a pattern which satisfies $n_m \leq 2k$, $n_s \leq k$, $n_r \leq k$ when $n_{max} = 2k$, or which satisfies $n_m \leq 2k+1$, $n_s \leq k+1$, $n_r \leq k$, or $n_s \leq k$, $n_r \leq k+1$ when $n_{max} = 2k+1$, where,
    $n_{max}$ denotes a maximum continuous number of the same digits that develop when code patterns of two given samples are continuing,
    $n_s$ denotes a number of digits as counted from the first digit until a digit different from the first digit of the code pattern appears,
    $n_r$ denotes a number of digits as counted from the last digit until a digit different from the last digit of the code pattern appears,
    $n_m$ denotes a continuous number of the same digits that exist in a portion between the first digit and the last digit of the code pattern, and
    k denotes a positive integer; and
    a step for recording the signal that has been converted into the second binary code onto a magnetic recording medium after having inverted the code of every other sample.

2. A method of magnetically recording video signals according to claim 1, wherein said second binary code has a pattern consisting of eight bits, that satisfies $n_{max} = 6$, $n_m \leq 6$, $n_s \leq 3$ and $n_r \leq 3$.

3. A method of magnetically recording video signals according to claim 1, wherein said second binary code has a pattern consisting of eight bits, that satisfies $n_{max} = 7$, $n_m \leq 6$, and $n_s \leq 4$, $n_r \leq 3$, or $n_s \leq 3$, $n_r \leq 4$.

4. A method of magnetically recording video signals according to claim 1, wherein said second binary code has a pattern consisting of eight bits, that satisfies $n_{max} = 8$, $n_m \leq 6$, $n_s \leq 4$, $n_r \leq 4$.

5. A method of magnetically recording video signals according to claim 1, wherein said second binary code consists of:
    a code having a pattern consisting of eight bits, that satisfies $n_{max} = 6$, $n_m \leq 6$, $n_s \leq 3$, $n_r \leq 3$;

and
    a code having a pattern consisting of eight bits, that satisfies $n_{max} = 7$, $n_m \leq 6$ and $n_s \leq 4$, $n_r \leq 3$, or $n_s \leq 3$, $n_r \leq 4$.

6. A method of magnetically recording video signals according to claim 5, wherein said code having a pattern consisting of eight bits, that satisfies $n_{max} = 7$, $n_m \leq 6$ and $n_s \leq 4$, $n_r \leq 3$, or $n_s \leq 3$, $n_r \leq 4$, is comprised of three patterns in which the number of the 1's is six in eight bits, and a pattern in which the number of the 1's is seven or five in eight bits.

7. A method of magnetically recording video signals according to claim 1, wherein said analog video signal consists of a luminance signal and at least one kind of chrominance signal, said luminance signal and said chrominance signal are converted into said first binary codes, respectively, and are then converted into said second binary codes, respectively.

8. A method of magnetically recording video signals according to claim 7, wherein the luminance signal converted into the first binary code is then converted into a second binary code which consists of:

a code having a pattern consisting of eight bits, that satisfies $n_{max}=6, n_m \leq 6, n_s \leq 3, n_r \leq 3;$ and a code having a pattern consisting of eight bits, that satisfies $n_{max}=7, n_m \leq 6$ and $n_s \leq 4, n_r \leq 3,$ or $n_s \leq 3, n_r \leq 4.$ 9. A method of magnetically recording video signals according to claim 8, wherein said code having a pattern consisting of eight bits, that satisfies $n_{max}=7, n_m \leq 6$ and $n_s \leq 4, n_r \leq 3,$ or $n_s \leq 3, n_r \leq 4,$ is comprised of three patterns in which the number of the 1's is six in eight bits, and a pattern in which the number of the 1's is seven or five in eight bits.

10. A method of magnetically recording video signals according to claim 7, wherein the chrominance signal converted into the first binary code is then converted into a second binary code having a pattern consisting of eight bits, that satisfies $n_{max}=8, n_m \leq 6, n_s \leq 4, n_r \leq 4.$ 11. A method of magnetically recording video signals, comprising:
a step for preparing a code conversion table in which a first binary code is correspond to a second binary code having a pattern that satisfies $n_m \leq 2k, n_s \leq k, n_r \leq k$ when $n_{max}=2k$, or which satisfies $n_m \leq 2k+1, n_s \leq k+1, n_r \leq k,$ or $n_s \leq k, n_r \leq k+1,$ when $n_{max}=2k+1$, where,
$n_{max}$ denotes a maximum continuous number of the same digits that develop when code patterns of two given samples are continuting,
$n_s$ denotes a number of digits as counted from the first digit until a digit different from the first digit of the code pattern appears,
$n_r$ denotes a number of digits as counted from the last digit until a digit different from the last digit of the code pattern appears,
$n_m$ denotes a continuous number of the same digits that exist in a portion between the first digit and the last digit of the code pattern, and
k denotes a positive integer;
a step for coding a video signal that is to be recorded using the first binary code;
a step for converting the signal coded by the first binary code into a second binary code relying upon the code conversion table; and
a step for recording the signal that has been converted into the second binary code onto a magnetic recording medium after having inverted the code of every other sample.

12. A method of magnetically recording video signals according to claim 11, wherein said second binary code has a pattern consisting of eight bits, that satisfies $n_{max}=6, n_m \leq 6, n_s \leq 3$ and $n_r \leq 3.$ 13. A method of magnetically recording video signals according to claim 11, wherein said second binary code has a pattern consisting of eight bits, that satisfies $n_{max}=7, n_m \leq 6,$ and $n_s \leq 4, n_r \leq 3,$ or $n_s \leq 3, n_r \leq 4.$ 14. A method of magnetically recording video signals according to claim 11, wherein said second binary code has a pattern consisting of eight bits, that satisfies $n_{max}=8, n_m \leq 6, n_s \leq 4, n_r \leq 4.$ 15. A method of magnetically recording video signals according to claim 11, wherein said second binary code consists of:
a code having a pattern consisting of eight bits, that satisfies $n_{max}=6, n_m \leq 6, n_s \leq 3, n_r \leq 3;$ and a code having a pattern consisting of eight bits, that satisfies $n_{max}=7, n_m \leq 6$ and $n_s \leq 4, n_r \leq 3,$ or $n_s \leq 3, n_r \leq 4.$ 16. A method of magnetically recording video signals according to claim 15, wherein said code having a pattern consisting of eight bits, that satisfies $n_{max}=7, n_m \leq 6$ and $n_s \leq 4, n_r \leq 3,$ or $n_s \leq 3, n_r \leq 4,$ is comprised of three patterns in which the number of the 1's is six in eight bits, and a pattern in which the number of the 1's is seven or five in eight bits.

17. A method of magnetically recording video signals according to claim 11, wherein said video signal consists of a luminance signal and at least one kind of chrominance signal, said luminance signal and said chrominance signal are converted into said first binary codes, respectively, and are then converted into said second binary codes, respectively.

18. A method of magnetically recording video signals according to claim 17, wherein the luminance signal converted into the first binary code is then converted into a second binary code which consists of:
a code having a pattern consisting of eight bits, that satisfies $n_{max}=6, n_m \leq 6, n_s \leq 3, n_r \leq 3;$ and a code having a pattern consisting of eight bits, that satisfies $n_{max}=7, n_m \leq 6$ and $n_s \leq 4, n_r \leq 3,$ or $n_s \leq 3, n_r \leq 4.$ 19. A method of magnetically recording video signals according to claim 18, wherein said code having a pattern consisting of eight bits, that satisfies $n_{max}=7, n_m \leq 6$ and $n_s \leq 4, n_r \leq 3,$ or $n_s \leq 3, n_r \leq 4,$ is comprised of three patterns in which the number of the 1's is six in eight bits, and a pattern in which the number of the 1's is seven or five in eight bits.

20. A method of magnetically recording video signals according to claim 17, wherein the chrominance signal converted into the first binary code is then converted into a second binary code having a pattern consisting of eight bits, that satisfies $n_{max}=8, n_m \leq 6, n_s \leq 4, n_r \leq 4.$ 21. An apparatus for magnetically recording video signals, comprising:

an analog-to-digital converter which converts an analog video signal into a digital signal that is coded by a first binary code;

means which is equipped with a memory to store a code conversion table in which an output code produced by said analog-to-digital converter is corresponded to a second binary code having a pattern which satisfies $n_m \leq 2k, n_s \leq k, n_r \leq k$ when $n_{max}=2k$, or which satisfies $n_m \leq 2k+1, n_s \leq k+1, n_r \leq k$, or $n_s \leq k, n_r \leq k+1$ when $n_{max}=2k+1$, where, $n_{max}$ denotes a maximum continuous number of the same digits that develop when code patterns of two given samples are continuing, $n_s$ denotes a number of digits as counted from the first digit until a digit different from the first digit of the code pattern appears, $n_r$ denotes a number of digits as counted from the last digit until a digit different from the last digit of the code pattern appears, $n_m$ denotes a continuous number of the same digits that exist in a portion between the first digit and the last digit of the code pattern, and k denotes a positive integer; and which converts the output signal produced by the analog-to-digital converter into said second binary code based upon said conversion table;

means for inverting the code of the signals of said second binary code on every other sample; and means for recording onto a magnetic recording medium the signals of said second binary code which has been inverted on every other sample.

22. An apparatus for magnetically recording video signals according to claim 21, wherein said second binary code has a pattern consisting of eight bits, that satisfies $n_{max}=6, n_m \leq 6, n_s \leq 3$ and $n_r \leq 3$.

23. An apparatus for magnetically recording video signals according to claim 21, wherein said second binary code has a pattern consisting of eight bits, that satisfies $n_{max}=7, n_m \leq 6$, and $n_s \leq 4, n_r \leq 3$, or $n_s \leq 3, n_r \leq 4$.

24. An apparatus for magnetically recording video signals according to claim 21, wherein said second binary code has a pattern consisting of eight bits, that satisfies $n_{max}=8, n_m \leq 6, n_s \leq 4, n_r \leq 4$.

25. An apparatus for magnetically recording video signals according to claim 21, wherein said second binary code consists of:

a code having a pattern consisting of eight bits, that satisfies $n_{max}=6, n_m \leq 6, n_s \leq 3, n_r \leq 3$;

and a code having a pattern consisting of eight bits, that satisfies $n_{max}=7, n_m \leq 6$ and $n_s \leq 4, n_r \leq 3$, or $n_s \leq 3, n_r \leq 4$.

26. An apparatus for magnetically recording video signals according to claim 25, wherein said code having a pattern consisting of eight bits, that satisfies $n_{max}=7, n_m \leq 6$ and $n_s \leq 4, n_r \leq 3$, or $n_s \leq 3, n_r \leq 4$, is comprised of three patterns in which the number of the 1's is six in eight bits, and a pattern in which the number of the 1's is seven or five in eight bits.

27. An apparatus for magnetically recording video signals according to claim 21, wherein said analog video signal consists of a luminance signal and at least one kind of chrominance signal, said luminance signal and said chrominance signal are converted into said first binary codes, respectively, and are then converted into said second binary codes, respectively.

28. An apparatus for magnetically recording video signals according to claim 27, wherein the luminance signal converted into the first binary code is then converted into a second binary code which consists of:

a code having a pattern consisting of eight bits, that satisfies $n_{max}=6, n_m \leq 6, n_s \leq 3, n_r \leq 3$;

and a code having a pattern consisting of eight bits, that satisfies $n_{max}=7, n_m \leq 6$ and $n_s \leq 4, n_r \leq 3$, or $n_s \leq 3, n_r \leq 4$.

29. An apparatus for magnetically recording video signals according to claim 28, wherein said code having a pattern consisting of eight bits, that satisfies $n_{max}=7, n_m \leq 6$ and $n_s \leq 4, n_r \leq 3$, or $n_s \leq 3, n_r \leq 4$, is comprised of three patterns in which the number of the 1's is six in eight bits, and a pattern in which the number of the 1's is seven or five in eight bits.

30. An apparatus for magnetically recording video signals according to claim 27, wherein the chrominance signal converted into the first binary code is then converted into a second binary code having a pattern consisting of eight bits, that satisfies $n_{max}=8, n_m \leq 6, n_s \leq 4, n_r \leq 4$.

31. An apparatus for magnetically recording video signals, comprising:

a first analog-to-digital converter which converts a luminance signal into a digital signal;

a second analog-to-digital converter which converts a chrominance signal into a digital signal;

a first conversion means which is equipped with a first memory that stores a first code conversion table in which a code produced by said first analog-to-digital converter is corresponded to a different first code which consists of a code having a pattern consisting of eight bits satisfying $n_{max}=6, n_m \leq 6, n_s \leq 3, n_r \leq 3$ where, $n_{max}$ denotes a maximum continuous number of the same digits that develop when code patterns of two given samples are continuing, $n_r$ denotes a number of digits as counted from the first digit until a digit different from the first digit of the code pattern appears, $n_r$ denotes a number of digits as counted from the last digit until a digit different from the last digit of the code pattern appears, $n_m$ denotes a continuous number of the same digits that exist in a portion between the first digit and the last digit of the code pattern, and a code having a pattern consisting of eight bits satisfying $$n_{max}=7, n_m \leq 6 \text{ and } n_s \leq 4, n_r \leq 3, \text{ or } n_s \leq 3, n_r \leq 4$$

and which converts the signal produced by said first analog-to-digital converter into a signal of said different first code;

a second conversion means which is equipped with a second memory that stores a second code conversion table in which a code produced by said second analog-to-digital converter is corresponded to a different second code having a pattern consisting of eight bits satisfying $$n_{max}=8, n_m \leq 6, n_s \leq 4, n_r \leq 4$$

and which converts the signal produced by said second analog-to-digital converter into a signal of said different second code;

a first inverter means which inverts the code of signals of said different first code obtained by said first conversion means on every other sample;

a second inverter means which inverts the code of signals of said different second code obtained by said second conversion means on every other sample;

a first recording means which records onto a magnetic recording medium the signals of said different first code which has been inverted on every other sample; and a second recording means which records onto a magnetic recording medium the signals of said different second code which has been inverted on every other sample.

32. An apparatus for magnetically recording video signals according to claim 31, wherein said code having a pattern consisting of eight bits, that satisfies $$n_{max}=7, n_m \leq 6 \text{ and } n_s \leq 4, n_r \leq 3, \text{ or } n_s \leq 3, n_r \leq 4$$

is comprised of three patterns in which the number of the 1's is six in eight bits, and a pattern in which the number of the 1's is seven or five in eight bits.

33. An apparatus for magnetically recording video signals according to claim 27, wherein provision is made of means for processing a plurality of video signals that represent a plurlaity of different colors of subjects, in order to obtain luminance signals and chrominance signals of at least one kind.

34. An apparatus for magnetically recording video signals according to claim 31, further comprising means for processing a plurality of video signals that represent a plurality of different colors of subjects, in order to obtain luminance signals and chrominance signals of at least one kind.

* * * * *